(12) United States Patent
Furnary et al.

(10) Patent No.: US 7,846,406 B2
(45) Date of Patent: Dec. 7, 2010

(54) SCRUBBER FOR REMOVING POLLUTANTS FROM FLUE GAS

(76) Inventors: Kevin P. Furnary, 9750 Vale Rd., Vienna, VA (US) 22181; William Ellison, 4966 Tall Oaks Dr., Monrovia, MD (US) 21770

( * ) Notice: Subject to any disclaimer, the term of this patent is extended or adjusted under 35 U.S.C. 154(b) by 0 days.

(21) Appl. No.: 12/542,252

(22) Filed: Aug. 17, 2009

(65) Prior Publication Data
US 2010/0040524 A1 Feb. 18, 2010

Related U.S. Application Data

(60) Provisional application No. 61/089,694, filed on Aug. 18, 2008.

(51) Int. Cl.
*B01D 53/50* (2006.01)
*B01D 53/56* (2006.01)
*B01D 53/64* (2006.01)
*B01D 53/72* (2006.01)
*B01D 53/80* (2006.01)

(52) U.S. Cl. ............ 423/210; 423/243.01; 423/243.08; 423/235; 423/245.2; 422/168; 422/169; 422/170; 422/171; 422/172

(58) Field of Classification Search ................ 423/210, 423/243.01, 243.08, 235, 245.2; 422/168–172
See application file for complete search history.

(56) References Cited

U.S. PATENT DOCUMENTS

| 3,948,608 | A | | 4/1976 | Weir, Jr. ..................... 23/284 |
|---|---|---|---|---|
| 5,328,673 | A | * | 7/1994 | Kaczur et al. ............... 423/235 |
| 5,639,434 | A | * | 6/1997 | Patrikainen et al. ......... 423/235 |
| 5,674,459 | A | * | 10/1997 | Gohara et al. ............... 422/170 |
| 5,988,115 | A | | 11/1999 | Anderson et al. ........... 122/4 D |
| 6,042,340 | A | | 3/2000 | Melbourne ................... 417/151 |
| 6,235,256 | B1 | | 5/2001 | Lang et al. ................... 423/220 |
| 6,676,912 | B1 | * | 1/2004 | Cooper et al. ............... 423/235 |
| 7,048,899 | B2 | * | 5/2006 | Alix et al. ................... 423/235 |
| 2007/0212288 | A1 | * | 9/2007 | Holst et al. ............. 423/240 R |

OTHER PUBLICATIONS

International Search Report and Written Opinion issued for PCT Appln. No. PCT/US09/54056, dated Nov. 20, 2009.

* cited by examiner

*Primary Examiner*—Timothy C Vanoy
(74) *Attorney, Agent, or Firm*—Pillsbury Winthrop Shaw Pittman LLP

(57) ABSTRACT

A scrubber for scrubbing at least one pollutant from flue gas includes a first stage configured to provide a chemical oxidant to a stream of flue gas, and a second stage configured to provide a chemical or chemicals to the stream of flue gas, a scrubbing medium recirculation feature configured to continuously recirculate a slurry used in the second stage, and a by-product processing portion configured to remove a by-product from a stream of slurry withdrawn from the scrubber. The by-product includes reaction products of at least one pollutant.

20 Claims, 3 Drawing Sheets

SCRUBBER FOR REMOVING POLLUTANTS FROM FLUE GAS

CROSS-REFERENCE TO RELATED APPLICATIONS

This application claims the benefit of priority from U.S. Provisional Patent Application Ser. No. 61/089,694, filed on Aug. 18, 2008, the content of which is incorporated herein by reference in its entirety.

FIELD

The present invention is generally related to a scrubbing system, i.e., scrubber, for removing pollutants from flue gas. In particular, the present invention is directed to a scrubber for removing pollutants from flue gas exiting municipal solid waste incinerators and fossil fuel power boilers.

BACKGROUND

Typical wet scrubbing systems incorporate sprays, packed towers, or bubbling cascading trays designed to achieve high gas/scrubbing-medium contact area. And they require booster fans to draw the gas flow through the equipment and into contact with the scrubbing media. The necessarily extensive internal structure requires maintenance that usually takes the scrubber off line. Currently available pollutant removal technologies typically address only individual components e.g., to decrease emission of nitrogen oxides ($NO_x$) or to target mercury (Hg). Sole sulfur dioxide ($SO_2$) removal through flue gas desulfurization (FGD) scrubbing achieving only 90-98% removal efficiency may leave substantial reactive sulfur oxides contamination for downstream carbon dioxide ($CO_2$) capture technologies with which to cope.

Especially in the case of emission sources such as municipal refuse (solid waste) incinerators, in which raw gas $SO_2/NO_x$ concentration ratio is less than approximately 5 to 10, the generic oxidation-absorption chemical process mode is most applicable in providing simultaneous multi-pollutant removal by scrubbing. Therein, using an aqueous solution of an economical oxidant such as hydrogen peroxide ($H_2O_2$):

(a) Chemical reactions in an "Initial Stage" for pre-oxidation are:

$$2NO + 3H_2O_2 \rightarrow N_2O_5 + 3H_2O;$$

$$Hg(o) + 2H_2O_2 \rightarrow HgO_2 + 2H_2O; \text{ and}$$

(b) Chemical reactions in a "Final Stage" for removal are:

$$SO_2 + Ca(OH)_2 + \tfrac{1}{2}O_2 + H_2O \rightarrow CaSO_4 \cdot 2H_2O;$$

$$N_2O_5 + Ca(OH)_2 \rightarrow Ca(NO_3)_2 + H_2O;$$

$$HgO_2, \text{gasborne} \rightarrow HgO_2, \text{dissolved}.$$

In the case of gas cleaning applications in which the raw gas $SO_2/NO_x$ concentration ratio is consistently greater than approximately 10, e.g., medium/high sulfur coal-fired boilers, the generic oxidation-reduction chemical process mode may be used alternatively:

(c) Chemical reactions in the "Initial Stage" are:

$$NO + H_2O_2 \rightarrow NO_2 + H_2O;$$

$$Hg(o) + 2H_2O_2 \rightarrow HgO_2 + 2H_2O; \text{ and}$$

(d) Chemical reactions in the "Final Stage" are:

$$SO_2 + Ca(OH)_2 + \tfrac{1}{2}O_2 + H_2O \rightarrow CaSO_4 \cdot 2H_2O;$$

$$2NO_2 + 4SO_2 + 4Mg(OH)_2 \rightarrow N_2 + 4MgSO_4 + 4H_2O;$$

$$HgO_2, \text{gasborne} \rightarrow HgO_2, \text{dissolved}.$$

Powerspan, Inc. of Portsmouth, N.H., has, in a 50 MW slip-stream installation at First Energy's Burger Power Station, field demonstrated the alternative oxidation-reduction process mode via its ECO multi-pollutant scrubbing process, which uses ammonia in lieu of the above calcium hydroxide and magnesium hydroxide as chemical reagent. The facility achieves raw gas pre-oxidation by using a proprietary ECO electronic oxidation method.

BOC Gases (British Oxygen) of Murray Hill, N.J., (with many commercial installations including several at oil refinery fluid catalytic cracking units), has commercially applied the above oxidation-absorption process mode by widely field demonstrating its LoTox flue gas pre-oxidation process. In-duct injection of ozone-rich, gaseous oxygen is therein utilized by BOC Gases to oxidize $NO/NO_2$ gases to highly soluble and readily absorbed, low vapor pressure, $N_2O_5$ gas.

SUMMARY

Embodiments of the scrubbing system of the present invention uniquely achieve a dynamic gas/scrubbing-medium contact area that is not governed by the physical size of the contacting equipment and can be adapted to optimize the scrubbing performance. The scrubber of the present invention, by contrast with scrubbers of the prior art, has no internals requiring maintenance, only possible changes to externally accessible components of the in-parallel scrubbing elements constituting a module. The scrubbing system of the present invention has the capability and adaptability to allow it to meet and even exceed the performance in pollutant removal that is required to render the unit carbon capture ready. To do this, the final downstream gas treatment step serving the unit is advantageously operated to achieve simultaneous removal of $SO_2$, $NO_x$, and toxic metals (such as mercury). This reduces the emission of diverse pollutants so as to render the treated flue gas sufficiently uncontaminated to ensure unhindered operation of one or another relevant, alternative, emerging, carbon capture technologies employed downstream.

The key objective in simultaneous pollutant scrubbing is to thoroughly mix the de-dusted raw flue gas with a scrubbing medium, interacting the gas beforehand with a pre-treatment oxidizing medium, while also ensuring that the key/limiting, chemical reaction step(s) will readily and cost-effectively go to near-completion. The ideal scrubbing step creates adequately large chemical reaction surface area, with the active surface area undergoing continuous surface renewal, sustained/maintained over time during the course of reactions, this by intense liquid shearing and microscopic-scale mixing of the flue gas and the reactive chemicals with which it is brought in contact. The scrubber of the present invention can achieve this efficiently and effectively by its creating and amply sustaining a unique such gas-liquid-solid interfacial phase.

The scrubber embodiments of the present invention use a unique fluid dynamic method of flue gas wet scrubbing. The physical arrangement is adaptable for use of applicable chemical unit operation sequences achieving advantageous, desired simultaneous pollutant removal. The scrubbing takes place at uniquely high gas velocity and uses multiple, in-parallel, open-pipe scrubber elements to provide large-capacity single-module system construction, providing favorable cost-effectiveness in retrofit installation and operation. The mechanics of the fluid dynamic interaction achieved in this scrubbing of the flue gas applies a simple mechanical engineering design comprising the above, cylindrical, duct-like absorber elements, and continuously renewed, internal reaction-surface, while devoid of internal components or obstructions. The pressurized, input, contacting/scrubbing media, imposing their kinetic energy, are introduced tangentially and stepwise along the course of large-diameter, such, circular reaction elements at several sequential contact stations, each of which comprises a ring of injection ports around the cylinder perimeter. Intense mixing and reaction is achieved within the duct between stations, this augmented via dynamic flow interaction and resulting pronounced fluid shearing and surface renewal.

In an embodiment of the present invention, there is provided a scrubber for scrubbing at least one pollutant from flue gas. The scrubber includes a first stage configured to input a solution-form or gaseous chemical oxidant to the stream of inlet dedusted raw flue gas, and a second stage configured to provide entry of a chemical solution or slurry to the stream of flue gas. The second stage includes a first nozzle array, gas-flow-wise, constructed and arranged to direct a first flow of a reacting chemical or chemicals into the stream of flue gas in a first tangential direction, and a second nozzle array located downstream from the first nozzle array with respect to the direction of flow of the stream of flue gas. The second nozzle array is constructed and arranged to direct a second flow of the reacting chemical or chemicals into the flue gas in a tangential direction that is substantially opposite that of the first tangential flow entry to the flue gas stream, this to create hydraulic shear within the stream of flue gas. A recirculation feature is configured to continuously recirculate the slurry or solution use in the second stage, and further provision is made to process reaction by-product. The by-product includes reaction product originating from at least one pollutant.

In an embodiment of the present invention, there is provided a method for scrubbing at least one pollutant from the flue gas. The method includes reacting chemical oxidant with flue gas in a first stage, and reacting chemical or chemicals with the flue gas in a second stage, the latter using a slurry or solution, this by injecting a portion of the reacting chemicals or chemicals into the flue gas in a first tangential direction with a first nozzle array and, downstream, gas-flow-wise, injecting the reacting chemical or chemicals into the flue gas with a second nozzle array in a second tangential direction that is opposite to the first direction. The second nozzle array location is downstream of the first nozzle array location. The injecting of the reacting chemical or chemicals with both the first nozzle array location and the second nozzle array location creates hydraulic shear within the stream of the flue gas. The method also includes continuously recirculating the scrubbing medium within the second stage with provision for removing a by-product from the scrubbing medium, whereby the by-product includes the product of reaction with at least one pollutant.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
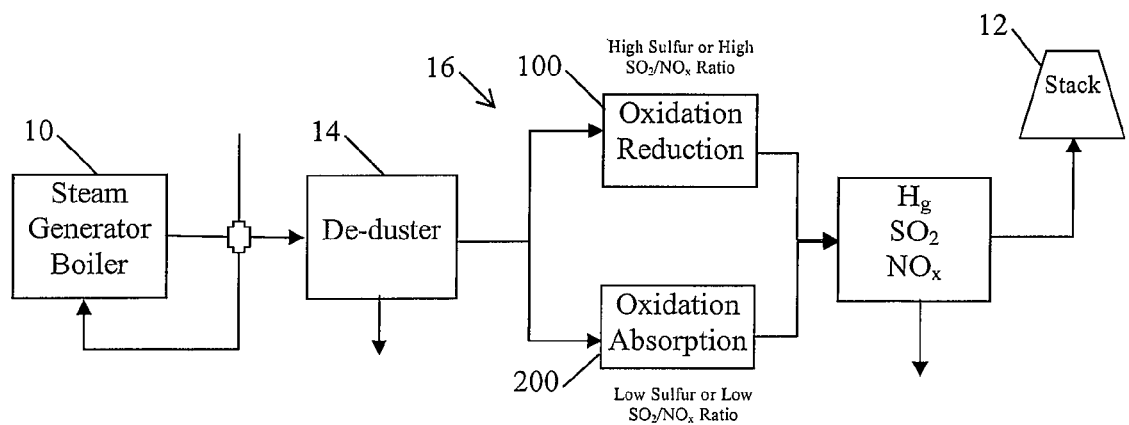
FIG. 1 is a schematic flow diagram showing a path of a flow of flue gas from a steam generator boiler, through the above scrubbing system, and to a stack.

FIG. 1 is a schematic flow diagram that illustrates a path of a flow of flue gas from a steam generator boiler 10, which may be a fossil fuel power boiler or an incinerator, to a stack 12 in accordance with embodiments of the present invention. As illustrated, the flue gas exits the boiler 10 and enters a de-duster 14, which may be an electrostatic precipitator (ESP) or any other suitable piece of equipment that is configured to remove solid particulates, such as fly ash, from the flue gas. After the flue gas has been de-dusted, the flue gas flows to a scrubbing system 16 so that pollutants, such as nitrogen oxides, sulfur dioxide, and mercury, may be removed from the flue gas by a chemical process prior to the flue gas exiting the stack 12. With the pollutants substantially or almost completely removed from the flue gas prior to the flue gas exiting the stack 12, the gas that exits the stack 12 and its combustion source may be considered to be carbon capture ready ("CCR").

Depending on the concentration ratio of sulfur dioxide relative to nitrogen oxides in the inlet flue gas, a scrubbing system 100 that is configured to operate in an oxidation-reduction chemical process mode, or a scrubbing system 200 that is configured to operate in an oxidation-absorption mode, may be used. Specifically, if the sulfur dioxide to nitrogen oxides ratio is relatively high, e.g. about 10 or greater, the scrubbing system 100 may be configured to operate in the oxidation-reduction chemical process mode. If the sulfur dioxide to nitrogen oxides ratio is relatively low, e.g., approximately 10 or less, the scrubbing system 200 that is configured to operate in the oxidation-absorption mode would be used. Processes used in both scrubbing systems 100 and 200 are discussed in further detail below.

Figure 2:
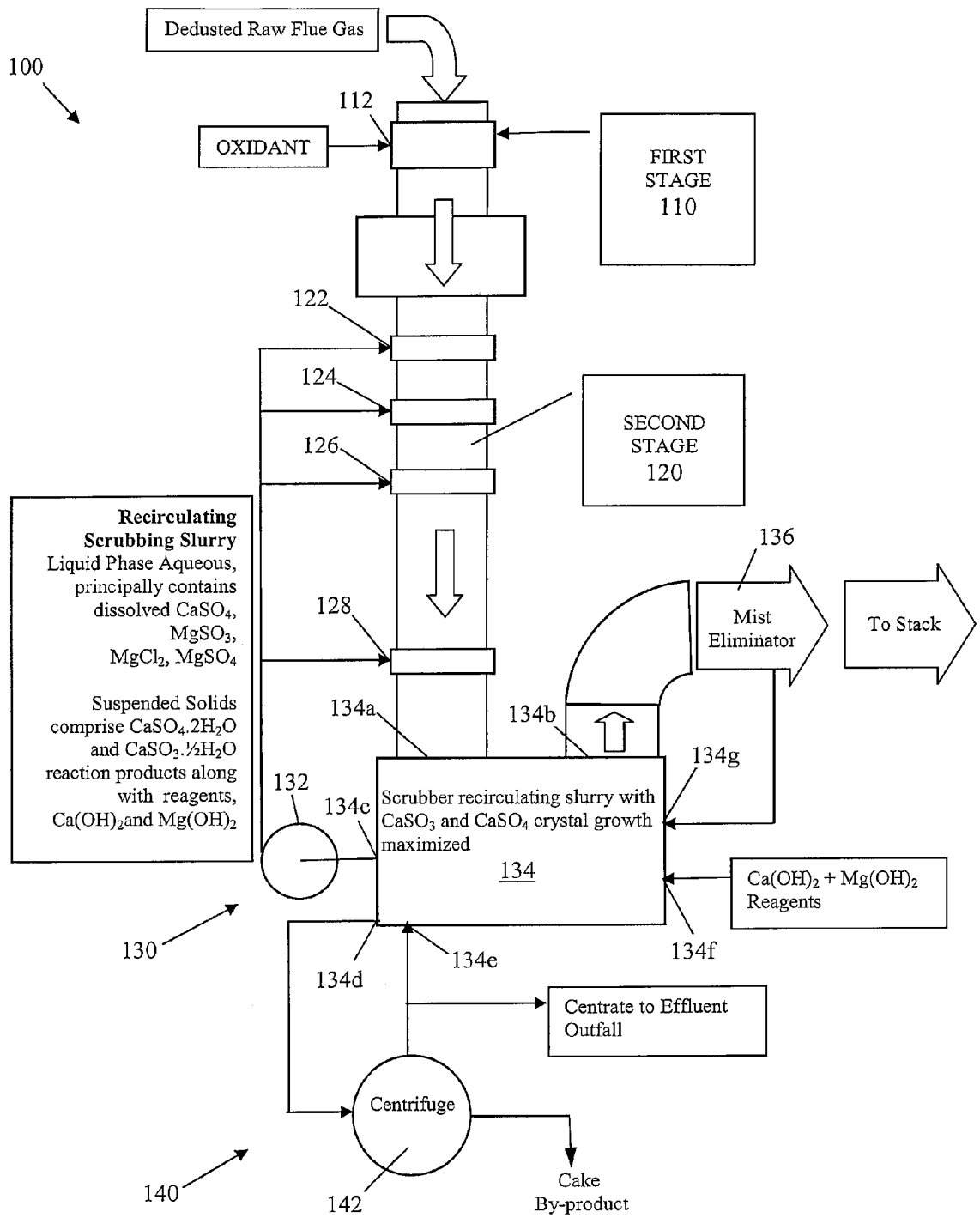
FIG. 2 is a schematic diagram showing the scrubbing system configured to operate in an oxidation-reduction process mode according to an embodiment of the present invention.

FIG. 2 shows the schematic layout of an embodiment of the scrubbing system 100 that is configured to operate in the oxidation-reduction chemical process mode. The alternative oxidation-absorption mode differs in that it has no need for chemical reduction of $NO_x$ in the scrubbing step, as discussed in greater detail below in conjunction with FIG. 3. The raw flue gas flows to the scrubbing system 100 after being de-dusted in the de-duster 14, as discussed above. As illustrated in FIG. 2, the scrubbing system 100 includes a first stage 110, a second stage 120, a medium recirculating feature 130, and a by-product preparation portion 140, all of which are discussed in further detail below.

The first stage 110 is the stage in which flue gas pre-oxidation is carried out. The first stage 110 is configured to provide an oxidant to the stream of the flue gas such that the oxidant may be interacted with the flue gas to oxidize NO to $NO_2$ as well as oxidize an amount of gasborne elemental mercury (Hg). In an embodiment, the oxidant comprises a solution of hydrogen peroxide ($H_2O_2$). The oxidant is injected into the stream of flue gas in a manner that allows the oxidant to mix with the flue gas so that the desired chemical reactions may take place during this stage of the scrubbing system 100. For example, the injection of the oxidant into the stream of flue gas may be via a single entry location 112.

The rate of oxidant injection may be actively monitored to appropriately match the NO concentration of the raw flue gas that enters the scrubbing system 100. This may be done by having an in-line gas analyzer (not shown) positioned between the de-duster 14 and the first stage 110. The in-line gas analyzer may be configured to measure the NO concentration in the flue gas and may be in signal communication with a controller that is also in signal communication with a flow regulator that is provided in an oxidant supply line. This way, as the level of NO in the flue gas changes, the level of oxidant being provided to the first stage 110 may be automatically adjusted accordingly.

The reaction of the oxidant with the NO to form $NO_2$ should be a rapid reaction that takes place in minimal gas residence time. The illustrated embodiment is not intended to be limiting in any way. For example, while in an embodiment, only a single entry location may be used to provide the oxidant at the first stage 110, additional ports may be used to provide the oxidant during the first stage. And, optionally, dual ports may be positioned so as to function sequentially as do the multiple ports in the scrubbing system (second stage) 120 below. As a concurrent benefit at the first stage 110, an amount of gasborne elemental mercury can advantageously also be oxidized, thereby allowing efficient removal of the thus oxidized mercury downstream, i.e., in the scrubbing system.

The second stage 120 is constructed and arranged to carry out multi-pollutant removal simultaneously. The second stage 120 is configured to provide entry of a chemical or chemicals to the flue gas stream, this/these different from the oxidant discussed above that is provided to the stream of flue gas in the first stage 110. The chemical(s) may include an aqueous slurry or solution (i.e., scrubbing medium) that may principally contain dissolved $CaSO_4$, $MgSO_3$, $MgCl_2$, and $MgSO_4$, and may be bolstered by a continuous fresh feed of $Ca(OH)_2$ and $Mg(OH)_2$ reagents. This slurry, provided to the second stage 120 by the medium recirculating feature 130, may remove $SO_2$, $NO_x$, such as $NO_2$, and oxidized mercury from the stream of flue gas. In addition, the recirculating slurry may also remove dioxin ($C_4H_4O_2$) from the stream of flue gas.

The recirculating slurry may be tangentially injected into the flue gas stream at a plurality of locations in the second stage 120 in the gas-wise flow direction, a continuously renewing, active reaction surface being achieved within the gas stream to sufficiently drive the desired chemical reactions to completion. As illustrated, the second stage 120 may include a first tangential port location 122 that is constructed and arranged to direct a first flow of the slurry in a first tangential direction into the stream of flue gas and a second tangential port location 124 that is located downstream from the first tangential port location 122 with respect to the direction of flow of the flue gas stream. The second tangential port location 124 may be constructed and arranged to direct a second flow of the slurry in a second tangential direction that is substantially opposite that of the first tangential direction into the stream of the flue gas so as to create hydraulic shear within the stream of the flue gas. The first and second tangential ports 122, 124 of the second stage 120 may be constructed and arranged to be of the same or substantially the same configuration as the annular chambers and inlet ports of the fluid handling device that is described in U.S. Pat. No. 6,042,340, which is incorporated herein by reference in its entirety.

As illustrated in FIG. 2, additional tangential ports in the form of a third tangential port location 126 and a fourth tangential port location 128 may also be provided along the flow path of the flue gas in the second stage 120 so that additional mixing of solution (or slurry) with the flue gas may be achieved. Even more tangential ports may also be provided, depending on the specifications of the scrubbing system 100. The direction of medium flow provided by the tangential ports 122, 124, 126, 128 may be chosen to optimize the desired chemical reactions in the second stage 120.

The recirculating feature 130 may include a recirculating flow generator 132, i.e., pump, and a vessel 134 that are constructed and arranged to provide a continuously recirculating flow of the slurry to the second stage 120 of the scrubbing system 100. The flow of the treated flue gas may be such that it enters the vessel 134 at an inlet 134a at top side of the vessel 134 and exits the vessel 134 at an outlet 134b at the top side of the vessel 134. This may allow the slurry to substantially drop out of the flue gas flow stream via gravity. The illustrated embodiment is not intended to be limiting in any way. The inlet 134a and the outlet 134b for the flue gas may be located at surfaces other than the top side of the vessel 134, such as on side surfaces. The flow generator 132 may be connected to a lower portion of the vessel 134 at an outlet 134c so that the amount of flue gas entrained in the recirculating slurry stream may be minimized and so that only a liquid is recirculated to the second stage 120.

The dynamic flow at the outlet of the second stage 120, which corresponds to the inlet 134a of the vessel 134 may create the first stage of gas/fluid disengagement as the treated flue gas and spent slurry enter the vessel 134. The by-product preparation portion 140 is configured to manage isolation of by-products (including those of the targeted pollutants) taken up in the slurry. The by-product processing facility 140 may include a centrifuge 142. Suspended solids in a purged portion of spent scrubbing slurry may be drawn from the recirculating vessel 134 at an outlet 134d located at a low point of the vessel 134 and separated from the slurry by first using a centrifugal action in a liquid hydrocyclone (not shown). A resulting high density slurry output may be further dewatered in the centrifuge 142 to form cake solids, and a portion of the liquid centrate, as necessary, constituting process blowdown, may be discharged as an outfall wastewater stream. The balance of the purged slurry may be returned to the recirculating vessel 134, e.g. at an inlet 134e. The potency of the scrubbing slurry may be maintained by additions of $Ca(OH)_2$ and $Mg(OH)_2$, i.e., slaked lime and magnesium hydroxide, at an inlet 134f of the vessel 134.

As illustrated in FIG. 2, after the slurry has been disengaged from the flue gas, the treated flue gas may exit the vessel 134 at the outlet 134b and may be further treated at a mist eliminator 136 to remove droplets entrained in the flue gas. The liquid recovered from the mist eliminator 136 may be piped back to the vessel 134, e.g. at an inlet 134g. The treated flue gas may be either exhausted to the stack 12 or to any one of several known carbon dioxide capture technologies.

In an embodiment, the operation of the second stage 120, which may be typically of the wet lime type, is enhanced with an additive feed of slaked MgO to generate substantial, chemically reducing, sulfite ion molarity in the scrubbing medium, magnesium sulfite being 1,000 times as water soluble as calcium sulfite. The magnesium hydroxide feed, in addition to providing common magnesium-buffered lime scrubbing operation, may provide adequate chemical reduction (deoxidation) capability for converting the previously formed gaseous $NO_2$, above, to $N_2$. In a scrubber system having adequate mass transfer capacity brought about by cost-effective chemical process design, the liquid phase of the recirculating slurry having substantial dissolved-sulfite content, (the sulfite originating from simultaneous, coincident collection of $SO_2$ and elevated in concentration via ample use of the slaked MgO additive), may chemically reduce $NO_2$ to $N_2$, as above, with a very small proportion of $NO_2$, being taken up by the slurry.

In the operation of the oxidation-reduction chemical process mode discussed above, and with adequate mass transfer capacity in the scrubber 100 and sufficient supply of $Mg(OH)_2$ additive, flue gas $NO_x$ adjusted to the form of $NO_2$ may be chemically reduced to $N_2$.

Figure 3:
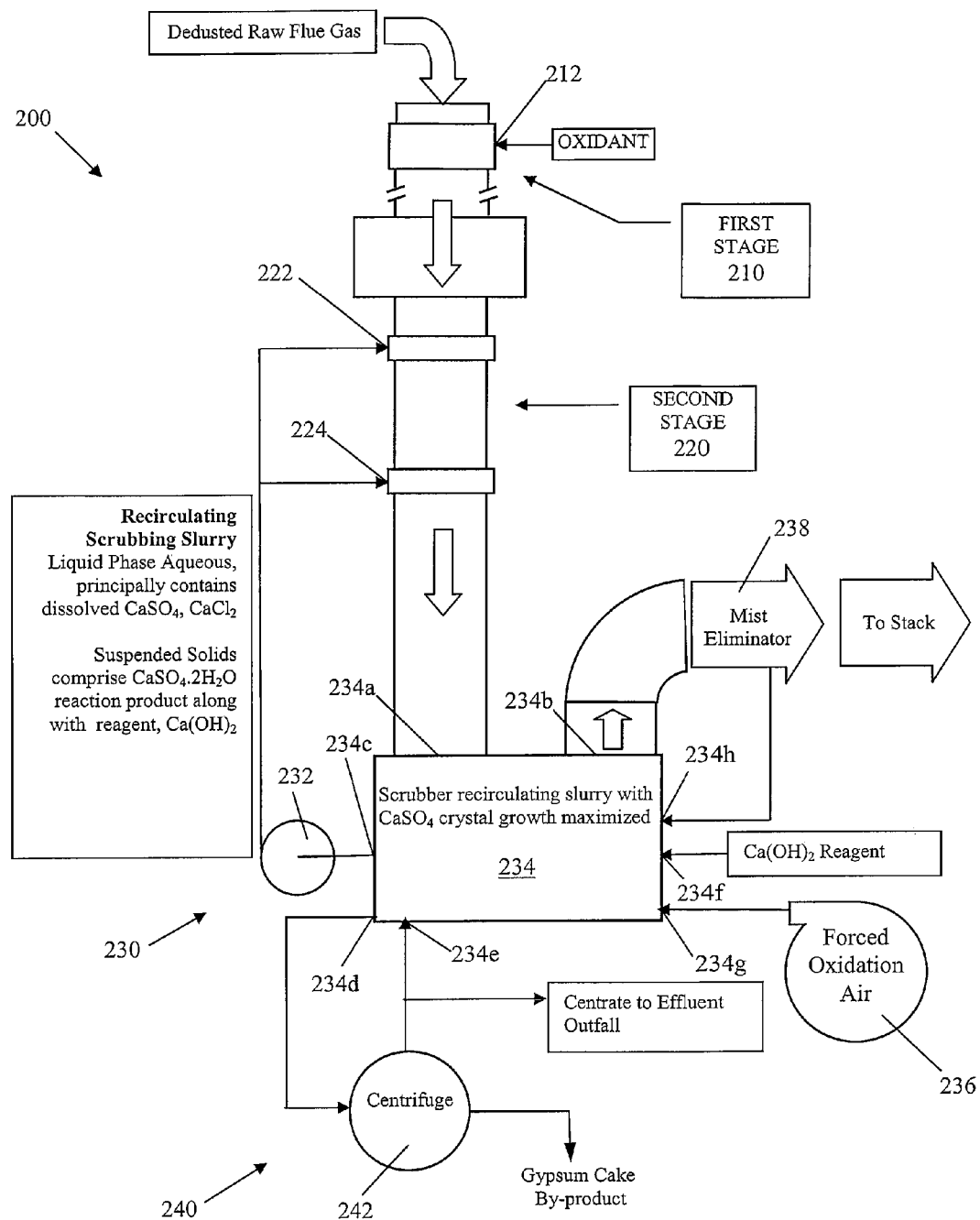
FIG. 3 is a schematic diagram showing the scrubbing system configured to operate in an oxidation-absorption process mode according to an embodiment of the present invention.

FIG. 3 shows the schematic layout of an embodiment of the scrubbing system 200 that is configured to operate in the oxidation-absorption process mode. The raw flue gas flows to the scrubber 200 after de-dusting via the de-duster 14 described above. As illustrated in FIG. 3, the scrubbing system 200 includes a discrete, by located, separately positioned, first stage 210, an in-situ second stage 220, a medium recirculating feature 230, and a by-product preparation portion 240, all of which will be discussed in further detail below.

Flue gas pre-oxidation in the first stage 210 may be carried out with an oxidant being combined with the flue gas to oxidize the NO in the flue gas to $N_2O_5$. The first stage 210 is preferably located as far gas-wise upstream of the second stage 220 as feasible to maximize available gas residence time available for this fullest possible oxidation of NO. An amount of gasborne toxic metals, including elemental mercury, may also be oxidized in the first stage 210. In an embodiment, the oxidant may comprise a solution of hydrogen peroxide ($H_2O_2$). The oxidant may be injected into the stream of flue gas via a single port 212 in a manner that allows the oxidant to mix with the flue gas so that the desirable chemical reactions may take place at this stage in the scrubbing system 200 upstream of the second stage 220.

The rate of oxidant injection may be actively monitored to match the NO concentration of the raw flue gas that enters the scrubbing system 200. This may be done by having an in-line gas analyzer (not shown) positioned between the de-duster 14 and the first stage 210. The in-line gas analyzer may be configured to measure the NO concentration in the flue gas and may be in signal communication with a controller that is also in signal communication with a flow regulator that is provided in an oxidant supply line. This way, as the level of NO changes in the flue gas, the level of oxidant being provided to the first stage 210 may be automatically adjusted accordingly.

The illustrated embodiment is not intended to be limiting in any way. For example, while only a single port location 212 may be used to provide the oxidant at the first stage 210, additional ports may be used to provide the oxidant in the first stage. And, optionally, dual ports may be sequenced to function interactively as do the multiple ports in the scrubbing system, below. As a concurrent benefit at the first stage 210, an amount of gasborne elemental mercury may advantageously also be oxidized, thereby allowing efficient removal further downstream, i.e., in the scrubbing system, of mercury so oxidized.

The second stage 220 is constructed and arranged to carry out multi-pollutant removal simultaneously. The second stage 220 is configured to provide a chemical or chemicals to the flue gas stream, which is different from the oxidant provided to the stream of flue gas in the first stage 210 discussed above. The aqueous phase of the scrubbing media principally contains dissolved $Ca(NO_3)_2$, $CaSO_4$ and $CaCl_2$ bolstered by the fresh feed of $Ca(OH)_2$ reagent. This recirculating slurry removes $SO_2$, $N_2O_5$ and metallic oxides from the flue gas. In addition, the recirculating slurry may also remove dioxin ($C_4H_4O_2$) from the stream of flue gas.

The recirculating slurry may be tangentially injected into the flue gas stream at a plurality of locations in the second stage 220 to create continuously renewing, chemical reaction surface within the gas stream sufficient to drive the chemistry to completion. As illustrated, the second stage 220 may include a first tangential port location 222 that is constructed and arranged to direct a first flow of the slurry in a first tangential direction into the stream of the flue gas, and a second tangential port location 224 that is positioned downstream from the first tangential port location 222 with respect to the direction of flow of the flue gas stream. The second tangential port location 224 may be constructed and arranged to direct a second flow of the slurry in a second tangential direction that is substantially opposite the first tangential direction into the stream of the flue gas to create hydraulic shear within the stream of the flue gas. The first and second tangential ports 222, 224 of the second stage 220 may be constructed and arranged to be of the same or substantially the same configuration as the annular chambers and inlet ports of the fluid handling device that is described in U.S. Pat. No. 6,042,340, which is incorporated herein by reference in its entirety.

Although not illustrated in FIG. 3, additional tangential ports may also be provided along the flow path of the flue gas in the second stage 220 so that additional mixing of the second solution (slurry) with the flue gas may be achieved.

The medium recirculating feature 230 may include a recirculating flow generator 232, which may be a pump, and a vessel 234 that are constructed and arranged to provide a continuous flow of the slurry to the second stage 220 of the scrubbing system 200. The flow of the flue gas may be such that it enters the vessel 234 at an inlet 234a at top side of the vessel 234 and exits the vessel 234 at an outlet 234b at the top side of the vessel 234. This may allow the slurry to drop out of the treated flue gas flow stream via gravity. The illustrated embodiment is not intended to be limiting in any way. The inlet 234a and the outlet 234b for the flue gas may be located at surfaces other than the top side of the vessel 234, such as on side surfaces. The flow generator 232, e.g. a pump, may be connected to a lower portion of the vessel 234 at an outlet 234c so that the amount of flue gas entrained in the recirculating stream may be minimized, and so that only a liquid is recirculated to the second stage 220.

The dynamic flow at the outlet of the second stage 220, which corresponds to the inlet 234a of the vessel 234 may create the first stage of gas/fluid disengagement as the flue gas and slurry enter the vessel 234. The by-product preparation portion 240 is configured to manage by-products, such as $SO_2$, $N_2O_5$ and metallic oxides taken up in the slurry. By-product preparation portion 240 may include a centrifuge 242. Suspended solids in a purged portion of spent scrubbing slurry may be drawn from the vessel 234 at an outlet 234d located at a lower section of the vessel 234 and first separated from the slurry by using a centrifugal action in a liquid hydrocyclone (not shown). A resulting high density slurry output may be further dewatered in the centrifuge 242 to form solids cake, and a portion of the liquid centrate may be discharged to waste as a wastewater effluent outfall. The balance of the slurry may be returned to the vessel 234 at an inlet 234e. The potency of the scrubbing slurry may be maintained by addition of $Ca(OH)_2$ reagent, i.e., slaked lime, at an inlet 234f of the vessel 234. As shown in FIG. 3, a stream of oxidation air may also be provided to the vessel 234 at an inlet 234g of the vessel 234 to form coarse grained, readily dewatered, gypsum solids, $CaSO_4.2H_2O$. A suitable flow generator 236, such as a blower, may be configured to force the stream of oxidation air into the vessel 234 at a desired pressure.

As illustrated in FIG. 3, after the slurry has been disengaged from the flue gas, the treated flue gas may exit the vessel 234 at the outlet 234b and may be further treated to remove any droplets entrained in the flue gas with a suitable mist eliminator 238. The liquid recovered in the mist eliminator 238 may be piped back to the vessel 234 at an inlet 234h. The treated flue gas may be either exhausted to the stack 12 or to any one of several known carbon dioxide capture technologies.

Thus with adequate mass transfer capacity, $NO_x$, i.e. NO and $NO_2$, in the de-dusted raw flue gas may be chemically oxidized in the first stage 210 to a highly water soluble $NO_x$ form, i.e. $N_2O_5$. As a substantial concurrent benefit, much of the gasborne elemental mercury and other toxic metals may advantageously also be oxidized, thereby allowing efficient removal in the second stage 220, as discussed above.

Akin to very familiar and efficient passive removal of very highly water soluble HCl, (that occurs simultaneously with $SO_2$ removal from coal-fired, raw flue gas), the second stage 220 of the scrubbing system 200 may readily absorb $N_2O_5$ at high efficiency.

Embodiments of the scrubbing systems 100, 200 described above are such that the scrubbing systems 100, 200 may be retrofit to existing waste incinerators and steam generator boilers. Of course, the scrubbing systems 100, 200 may also be built into new installations of waste incinerators and steam generator boilers as well.

The scrubbing systems of embodiments of the present invention use dynamic forced turbulence, which effectively addresses the need for adequate mass transfer surface while also providing continuous surface renewal during the course of reaction. A large, reactive mass transfer surface, in a continuous state of renewal during reaction, may be effectively created and sustained. The dynamic action has the concurrent benefit of also providing motive power equivalent to that of a booster fan, without its capital cost and parasitic energy consumption, to drive the flue gas through the scrubber. The principal parasitic energy consumption is in pumping the oxidizing medium and the scrubbing medium into the stream of the flue gas at the first and second stages, respectively. Parasitic pumping energy in the case of a coal-fired boiler is estimated to be minimally between 0.6% and 0.7% of the system electric generating capacity. Embodiments of the present invention may provide a high superficial gas velocity throughout the scrubbing section including the dynamic sections, which is specified, nominally, to be between about 60 and 85 feet per second. The high gas velocity may directly lead to a compact scrubbing portion. The gas to liquid ratio (G/L) for common wet scrubbers is about 5-50 gallons per 1,000 ACF. In the scrubber embodiments of the present invention, the G/L may be only approximately 0.9 gal/1,000 ACF. This is conducive to the effectiveness of the scrubber operation in continuously renewing the potency of the chemical reaction surface area during the course of reactions.

The ultra high gas velocity wet scrubber embodiments of the present invention are driven by inlet liquid kinetic energy provided at the injection ports discussed above. With highly engineerable hydraulic shear, achievement of unique surface renewal in the scrubber may allow for highly efficient simultaneous removal of pollutants. Kinetic energy of the scrubbing medium is utilized in embodiments of the present invention to leverage the scrubbing process to a low parasitic energy consumption.

A scrubber operation based on this fluid dynamics design was shown to remove small-micron alumina dust from an industrial stack discharge. The air entrained dust was 3 μm size and was collected by a water medium. Mixing was achieved by drawing in dilute phase, air-entrained solids material and then also contacting this fine particulate with pressurized water. Also, activated carbon and flocculants are dry mixed commercially in this manner with an outstanding degree of dispersion indicating a high level of scrubbing effectiveness, this with a dense gaseous particulate loading significantly greater than is present in any commercial boiler flue gas stream.

One consideration in designing a scrubber in accordance with embodiments of the present invention is the speed of the chemical reaction(s) in the most critical/limiting process step of the scrubbing mode. In the oxidation-absorption process mode, the raw gas pre-treatment, (i.e. pre-oxidation), forming $N_2O_5$ gas may be considered to be the critical, process-limiting, chemical reaction rate. In the oxidation-reduction mode, the scrubbing of $NO_2$ to convert it to $N_2$ is the critical, process-limiting step. Such reactions vastly benefit from the use of effective means of maximizing and time-wise sustaining the amount of available contact surface area supporting the reaction. The alternatives in achieving adequate reaction rate consist either of increasing the surface area that provides interaction between the gas and contacting medium or increasing the reaction time during which the two streams are in contact. Specifically, an extended time of contact implies a need for a significantly larger absorber. Enhancing the amount and transient behavior, i.e. via physical disruption, of the reacting contact surface area, effectively achieved in the scrubber of embodiments of the present invention, does not, however, similarly imply a need for larger equipment size.

While specific embodiments of the invention have been described above, it will be appreciated that the invention may be practiced otherwise than as described. The descriptions above are intended to be illustrative, not limiting. Thus, it will be apparent to one skilled in the art that modifications may be made to the invention as described without departing from the scope of the claims set out below.

What is claimed is:

1. A scrubber for scrubbing at least one pollutant from flue gas, the scrubber comprising:
   a first stage configured to provide a chemical oxidant solution to a stream of flue gas; and
   a second stage configured to provide a second chemical or chemicals to the stream of flue gas, the second stage comprising
   a first nozzle array constructed and arranged to direct a first flow of the second chemical or chemicals in a first tangential direction into the stream of flue gas,
   a second nozzle array located downstream from the first nozzle array with respect to the direction of flow of the stream of flue gas, the second nozzle array constructed and arranged to direct a second flow of the second chemical or chemicals in a second tangential direction that is substantially opposite the first direction into the stream of flue gas to create hydraulic shear within the stream of flue gas,
   a recirculation feature configured to continuously recirculate a slurry-type medium or solution in the second stage, the slurry-type medium or solution being configured to capture and contain the at least one pollutant, and
   a by-product processing portion configured to remove and dewater a by-product from the slurry-type medium or solution, the by-product comprising a reaction product of at least one pollutant.

2. The scrubber according to claim 1, wherein the chemical oxidant solution comprises $H_2O_2$.

3. The scrubber according to claim 1, wherein the second chemical comprises $Ca(OH)_2$.

4. The scrubber according to claim 3, wherein the recirculation feature is constructed and arranged to grow crystals of $CaSO_4$ in the form of gypsum, $CaSO_4.2H_2O$.

5. The scrubber according to claim 3, wherein the second chemical further comprises $Mg(OH)_2$.

6. The scrubber according to claim 4, wherein the by-product processing portion comprises a centrifuge constructed and arranged to separate gypsum cake by-product from a portion of the slurry-type medium withdrawn from the recirculation feature.

7. The scrubber according to claim 1, wherein the first tangential direction is clockwise.

8. The scrubber according to claim 7, wherein the second tangential direction downstream is counterclockwise.

9. The scrubber according to claim 1, further comprising a plurality of first nozzles and a plurality of second nozzles that alternate with each other medium flow-direction wise along the direction of flow of the stream of flue gas.

10. The scrubber according to claim 1, wherein the slurry-type medium is configured to capture and contain at least one pollutant selected from the group consisting of: $SO_2$, $NO_x$, Hg, and $C_4H_4O_2$.

11. A method for scrubbing at least one pollutant from flue gas with a scrubber, the method comprising:
reacting a chemical oxidant with a stream of flue gas in a first stage;
reacting a second chemical with the flue gas in a second stage utilizing a slurry-type medium by contacting the second chemical with the flue gas in a first tangential direction with a first nozzle array and contacting the second chemical with the flue gas in a second tangential direction opposite the first direction with a second nozzle array, the second nozzle array being located downstream of the first nozzle array, wherein supplying the second chemical via the first nozzle array and the second nozzle array creates hydraulic shear within the stream of flue gas;
recirculating the slurry-type medium within the second stage; and
removing a by-product from the slurry-type medium, the by-product comprising a reaction product of the at least one pollutant.

12. The method according to claim 11, wherein the chemical oxidant comprises $H_2O_2$.

13. The method according to claim 11, wherein the second chemical comprises $Ca(OH)_2$.

14. The method according to claim 13, further comprising growing crystals of $CaSO_4$ in the form of $CaSO_4.2H_2O$ in the slurry-type medium.

15. The method according to claim 13, wherein the second chemical further comprises $Mg(OH)_2$.

16. The method according to claim 11, wherein removing the by-product from the slurry-type medium comprises separating a gypsum cake by-product from a portion of the slurry-type medium withdrawn from the scrubber.

17. The method according to claim 11, wherein the first tangential direction is clockwise.

18. The method according to claim 17, wherein the second tangential direction is counterclockwise.

19. The method according to claim 11, wherein reacting the second chemical with the flue gas in the second stage using the slurry-type medium further comprises introducing the second chemical with a plurality of first nozzles and a plurality of second nozzles, the first nozzles and second nozzles alternating with each other along the direction of the stream of flue gas.

20. The method according to claim 11, wherein the slurry-type medium assimilates the reaction product of at least one pollutant selected from the group consisting of: $SO_2$, $NO_x$, Hg, and $C_4H_4O_2$.

* * * * *